United States Patent
Joe et al.

(10) Patent No.: US 9,246,874 B2
(45) Date of Patent: Jan. 26, 2016

(54) VIRTUAL DOMAIN NAME SYSTEM

(75) Inventors: Brian W. Joe, West New York, NY (US);
Dante J. Pacella, Charles Town, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 103 days.

(21) Appl. No.: 13/537,126

(22) Filed: Jun. 29, 2012

(65) Prior Publication Data

US 2014/0006577 A1  Jan. 2, 2014

(51) Int. Cl.
*G06F 15/173* (2006.01)
*H04L 29/12* (2006.01)

(52) U.S. Cl.
CPC .......... *H04L 61/303* (2013.01); *H04L 61/1511* (2013.01)

(58) Field of Classification Search
CPC ...................... H04L 61/1511; H04L 29/12066; H04L 63/0227; H04L 51/12; H04L 67/306
USPC .......................................... 709/223, 226, 245
See application file for complete search history.

(56) References Cited

U.S. PATENT DOCUMENTS

| | | | | |
|---|---|---|---|---|
| 7,822,871 | B2* | 10/2010 | Stolorz et al. | 709/238 |
| 7,840,699 | B2* | 11/2010 | Fujita et al. | 709/238 |
| 8,521,851 | B1* | 8/2013 | Richardson et al. | 709/220 |
| 2006/0212599 | A1* | 9/2006 | Lucco et al. | 709/245 |
| 2009/0157889 | A1* | 6/2009 | Treuhaft | 709/230 |
| 2010/0034381 | A1* | 2/2010 | Trace et al. | 380/255 |
| 2011/0296053 | A1* | 12/2011 | Medved et al. | 709/241 |
| 2012/0063305 | A1* | 3/2012 | Chiu et al. | 370/230 |
| 2012/0158969 | A1* | 6/2012 | Dempsky et al. | 709/226 |
| 2012/0259954 | A1* | 10/2012 | McCarthy et al. | 709/218 |
| 2013/0067530 | A1* | 3/2013 | Spektor et al. | 726/1 |

OTHER PUBLICATIONS

"Configuring DNS Client Settings." TechNet. Microsoft, Jan. 21, 2005. Accessed via Web on Jun. 3, 2015. <https://technet.microsoft.com/en-us/library/cc778792(v=ws.10).aspx>.*
"What Is a Fully Qualified Domain Name (FQDN)?" Knowledge Base. Indiana University. Accessed via Web on Jun. 3, 2015. <https://kb.iu.edu/d/aiuv>.*
""Subdomains" vs "Host Names""Help Desk. Razyr Networks. Accessed via Web on Jun. 3, 2015. <https://razyr.zendesk.com/hc/en-us/articles/202651353--Subdomains-vs-Host-Names->.*

* cited by examiner

*Primary Examiner* — Brian J Gillis
*Assistant Examiner* — Austin Moreau (57) ABSTRACT

Methods, devices, and storage mediums resolve uniform resource identifiers to Internet protocol addresses based on various criteria. Additionally, uniform resource identifiers are resolved to Internet protocol addresses based on Application-Layer Traffic Optimization information and domain name system policies.

20 Claims, 9 Drawing Sheets

VIRTUAL DOMAIN NAME SYSTEM

BACKGROUND

A Domain Name System (DNS) resolves Uniform Resource Indicators (URIs) to Internet Protocol (IP) addresses. However, the DNS is unable to make any content routing decisions beyond URI/IP address translations.

DETAILED DESCRIPTION OF PREFERRED EMBODIMENTS

The following detailed description refers to the accompanying drawings. The same reference numbers in different drawings may identify the same or similar elements.

According to an exemplary embodiment, a virtual domain name system (vDNS) provides URI to IP address translations in which the IP addresses correlate to one or multiple criteria. That is, an IP address represents more than merely a network address for the URI. For example, a criterion may pertain to the type of content (e.g., international, Multipurpose Internet Mail Extensions (MIME), video-container type, etc.) or the type of application (e.g., real-time, non-real-time, e-mail, web browser, a peer-to-peer application, etc.) to which a virtual domain name system request pertains. Alternatively, a criterion may pertain to a type of device (e.g., a device of a machine-to-machine communication, a user device, a wireless device, a wired device, etc.) from which a virtual domain name system request originates, a level of security to which a virtual domain name system request pertains, a quality-of-service metric, or some other type of criterion that a virtual domain name system provider would like correlated to an IP address.

According to an exemplary embodiment, the virtual domain name system communicates with another device to select an IP address. For example, the virtual domain name system may communicate with an Application-Layer Traffic Optimization (ALTO) server and use ALTO information to provide a URI to IP address translation. The ALTO information may include information pertaining to maximum bandwidth, lowest cost to a user, topological proximity or approximate geographic location, minimum cross-domain traffic, etc. According to such an embodiment, a network element of the virtual domain name system includes an ALTO client to communicate with the ALTO server.

According to an exemplary embodiment, the virtual domain name system includes a virtual domain name system policy virtual machine (vDNS policy VM). For example, the vDNS policy VM may be implemented within a name server. Based on policies of the virtual domain name system, the vDNS policy VM may dynamically create new sub-domains. The new sub-domains may be, for example, dynamically and transiently configured, dynamically and permanently configured, or statically and permanently configured. By way of example, assume a service provider has an advertisement campaign that attracts a lot of users and creates excessive network traffic. The virtual domain name system may dynamically create new sub-domains based on policies pertaining to levels of traffic. According to other exemplary scenarios, policies may pertain to restrictions of access, internal versus external, latency, etc., as described further below.

The virtual domain name system allows for overlay networks or virtual networks to accommodate the one or multiple criteria pertaining to the IP address. Additionally, destinations of the IP addresses may support overlapping domains to support various criteria.

According to an exemplary embodiment, a virtual domain name system client generates and transmits a virtual domain name system request to the virtual domain name system. The virtual domain name system includes data or information pertaining to one or multiple criteria. According to an exemplary embodiment, an intermediary device, which is located between the virtual domain name system and the virtual domain name system client, generates and transmits a virtual domain name system request that includes data or information pertaining to one or multiple criteria. According to an exemplary embodiment, the virtual domain name system obtains data or information, in response to receiving a virtual domain name system request, which is used to perform a URI to IP address translation.

According to an exemplary embodiment, the virtual domain name system stores resource records that allow the virtual domain name system to perform URI to IP address translations based on one or multiple criteria. According to an exemplary implementation, resource records include one or multiple fields that indicate one or multiple criteria to which the resource records pertain. According to another implementation, a database that stores resource records is structured or organized based on one or multiple criteria to which the resource records pertain. For example, a set of resource records that share a common criterion are stored together.

Figure 1:
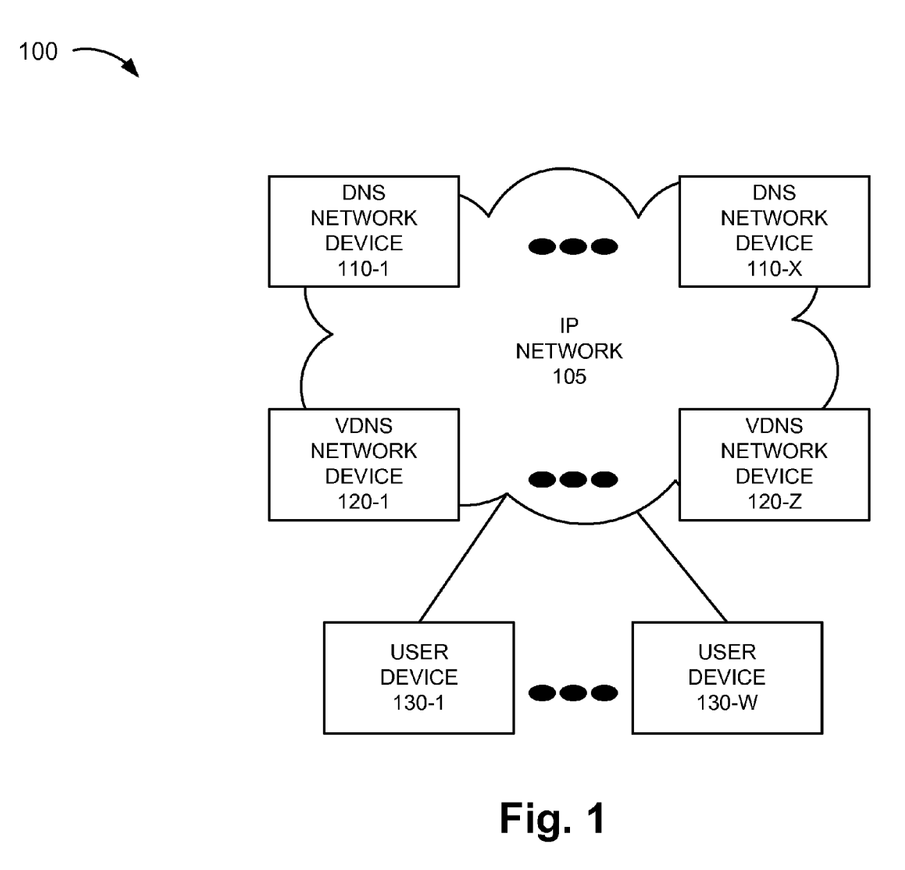
FIG. 1 is a diagram illustrating an exemplary environment in which an exemplary embodiment of a virtual domain name system may be implemented.

FIG. 1 is a diagram illustrating an exemplary environment in which an exemplary embodiment of a virtual domain name system may be implemented. As illustrated, an environment 100 includes an IP network 105. IP network 105 includes domain name system network devices 110-1 through 110-X, in which X>1 (also referred to individually as DNS network device 110 and collectively as DNS network devices 110) and virtual domain name system network devices 120-1 through 120-Z, in which Z>1 (also referred to individually as virtual DNS network device 120 and collectively as virtual DNS network devices 120). Environment 100 also includes user devices 130-1 through 130-W, in which W>1 (also referred to individually as user device 130 and collectively as user devices 130).

The number of devices and networks, and the configuration in environment 100 are exemplary. According to other embodiments, environment 100 may include additional devices, fewer devices, different devices, and/or differently arranged devices, than those illustrated in FIG. 1. For example, environment 100 may include an ALTO system. Additionally, or alternatively, environment 100 may not include DNS network devices 110. Additionally, or alternatively, environment 100 may include additional networks. For example, environment 100 may include access networks, intermediary networks, or a combination thereof.

A device may be implemented according to one or multiple network architectures (e.g., a client device, a server device, a peer device, a proxy device, or a combination thereof). Also, according to other embodiments, one or more functions and/or processes described as being performed by a particular device may be performed by a different device, or some combination of devices, which may or may not include the particular device.

Environment 100 may be implemented to include wired and/or wireless connections among the devices and network illustrated. A connection may be direct or indirect and may involve intermediary device(s) and/or network(s) not illustrated in FIG. 1. Additionally, the number and the arrangement of connections between the devices and the networks are exemplary.

IP network 105 includes a network that uses the Internet Protocol. For example, IP network 105 may be implemented as a private network, a public network, the Internet, etc. DNS network devices 110 include network devices that operate according to a DNS standard. For example, DNS network devices 110 include an authoritative name server, a root name server, and a name server.

Virtual DNS network devices 120 include network devices that perform URI to IP translation. According to an exemplary embodiment, virtual DNS network devices 120 include a virtual authoritative name server, a virtual root name server, and a virtual name server. According to such an embodiment, virtual DNS network devices 120 adopt the hierarchical nature of a conventional or well-known DNS architecture. According to an exemplary implementation, virtual DNS network devices 120 may use the DNS protocol in which available fields (e.g., a reserved field, etc.) in various DNS messages may be used to include criterion data or information pertaining to a process described herein. According to another exemplary implementation, virtual DNS network devices 120 may use a modified DNS protocol.

User device 130 includes a device having the capability to communicate with DNS network devices 110 and virtual DNS network devices 120. According to an exemplary embodiment, user device 130 includes a virtual DNS client resolver. The virtual DNS client resolver communicates with DNS networks devices 110 and virtual DNS network devices 120. For example, the virtual DNS client resolver generates virtual DNS queries or virtual DNS requests for URI to IP address resolutions. According to an exemplary implementation, the virtual DNS client resolver includes one or multiple criteria in a virtual DNS query or request.

According to an exemplary embodiment, user device 130 may be implemented as a user device. According to such an embodiment, user device 130 may be implemented as a smartphone, a smart television, a Web access device, a personal communication system (PCS) terminal, a pervasive computing device, a computer, or some other type of portable device, mobile device, handheld device, stationary device, vehicular-based device, etc.

According to another exemplary embodiment, user device 130 may be implemented as a machine device (e.g., associated with machine-to-machine communication). For example, user device 130 may be implemented as an entertainment device, a security device of a security system, a kiosk device, a financial device (e.g., an automated teller machine (ATM)), etc.

Figure 2:
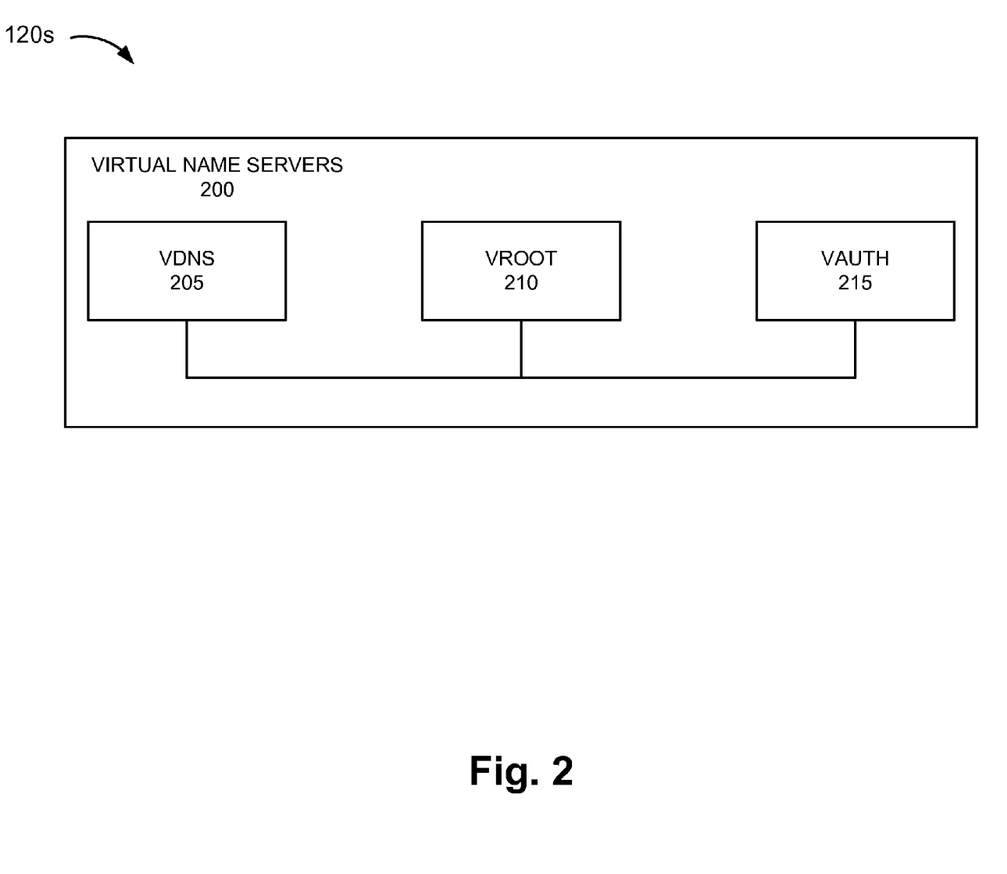
FIG. 2 is a diagram illustrating exemplary network elements of the virtual domain name system depicted in FIG. 1.

FIG. 2 is a diagram illustrating exemplary network elements of the virtual DNS network devices 120 depicted in FIG. 1. As illustrated, virtual DNS network devices 120 include a virtual domain name server 205, a virtual root name server 210, and a virtual authoritative name server 215 (also referred to collectively as virtual name servers 200).

The number of network elements and the configuration are exemplary. According to other embodiments, the virtual domain name system may be implemented with additional, fewer, or different network elements. For example, a policy device that stores virtual domain name system policies may be implemented with virtual name servers 200. Additionally, or alternatively, an ALTO system may be implemented with virtual name servers 200.

Virtual domain name server 205, virtual root name server 210, and virtual authoritative name server 215 provide a domain name system service that includes URI to IP address translation. The virtual domain name system service may offer other services, such as, for example, dynamically creating new sub-domains based on policies, as well as other services, as described herein. According to an exemplary implementation, virtual domain name server 205, virtual root name server 210, and authoritative name server 215 store virtual DNS records that provide a virtual domain name system service. For example, a virtual DNS record may include one or multiple criteria fields that identify one or multiple criteria correlated or mapped to an IP address. According to another implementation, a set of resource records that share a common criterion are stored together.

Virtual domain name server 205 includes a network device that provides URI to IP address translation and other services, as described herein. Virtual root name server 210 includes a network device that provides responses for a root domain or zone. Virtual root name server 210 stores a virtual root zone file that includes a list of names and IP addresses of virtual authoritative name servers 215 for a top-level domain (TLD), a country code TLD (ccTLD), or a combination thereof. Virtual authoritative name server 215 includes a network device that provides authoritative responses for a designated domain or zone. According to an exemplary embodiment, the virtual domain name system includes a master or a primary virtual authoritative name server 215 and a slave or a secondary virtual authoritative name server 215. The slave or the secondary virtual authoritative name server 215 serves as a backup to the master or the primary authoritative name server 215 and stores identical resource records.

As previously described, the virtual domain name system (e.g., virtual DNS network devices 120) implemented by virtual domain name server 205, virtual root name server 210, and virtual authoritative name server 215 provide a virtual domain name system service. According to an exemplary embodiment, the virtual domain name system uses criterion information to resolve to a record, and in turn, resolve to an IP address. For example, a criterion may pertain to a type of content, a type of application, a type of device, a level of security, a quality-of-service metric, some combination thereof, or some other criterion configurable by a virtual domain name system service provider.

According to an exemplary embodiment, the virtual domain name system uses ALTO information to resolve a URI to an IP address. The ALTO information may include information pertaining to maximum bandwidth, lowest cost to a user, topological proximity or approximate geographic location, minimum cross-domain traffic, etc. According to such an embodiment, virtual name servers 200 each include an ALTO client to communicate with an ALTO server. The ALTO client generates an ALTO query that includes, among other things, a set of destination network locations and an ALTO cost type. Upon receiving an ALTO response, virtual domain name server 205 may select an IP address based on a ranking or a numerical value associated with a cost given source and destination addresses.

According to an exemplary embodiment, the virtual domain name system uses virtual domain name system policies to resolve a URI to an IP address. According to an exemplary implementation, virtual authoritative name server 215 includes a virtual DNS policy VM. According to other implementations, the virtual DNS policy VM is implemented within another name server (e.g., virtual domain name server 205, etc.) or as a dedicated network device 120. Described below are some exemplary scenarios relating to the use of virtual domain name system policies.

Figure 3A:
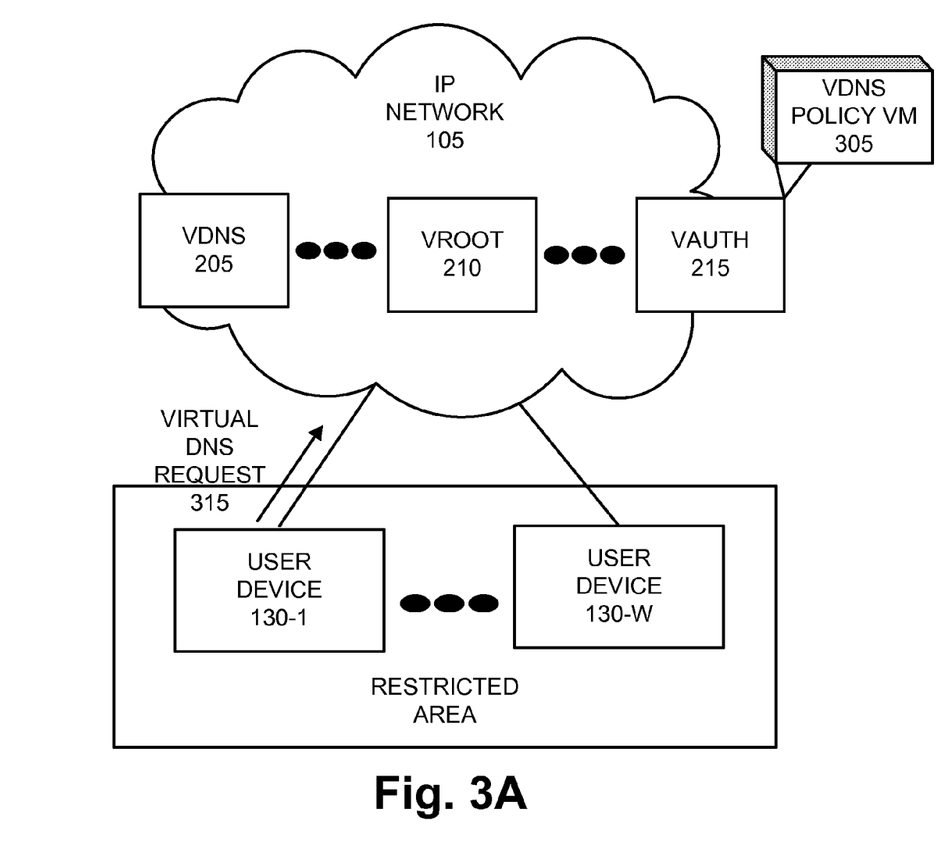
FIGS. 3A-3C are diagrams illustrating exemplary environments pertaining to exemplary scenarios for an exemplary embodiment of the virtual domain name system.

FIG. 3A is a diagram illustrating an exemplary environment in which policy-based IP address resolution may be implemented. According to an exemplary scenario, assume that user devices 130 reside in an area that restricts access to certain Internet sites. For example, assume that the policy pertains to a restriction based on a state law. As illustrated, virtual authoritative name server 215 includes a virtual DNS policy VM 305.

According to this exemplary scenario, when virtual authoritative name server 215 receives a virtual DNS request 315, DNS policy VM 305 identifies a policy that indicates to restrict access. According to an exemplary implementation, the policy restriction may cause virtual authoritative name server 215 to generate a response that denies an IP address resolution. According to another exemplary implementation, the policy restriction may cause virtual authoritative name server 215 to generate a response that provides a redirect to another IP address. The response may provide a redirect to a government web site that details the state law or provides an explanation as to the redirect. According to other scenarios, the policy may pertain to a restriction that is temporary in nature.

Figure 3B:
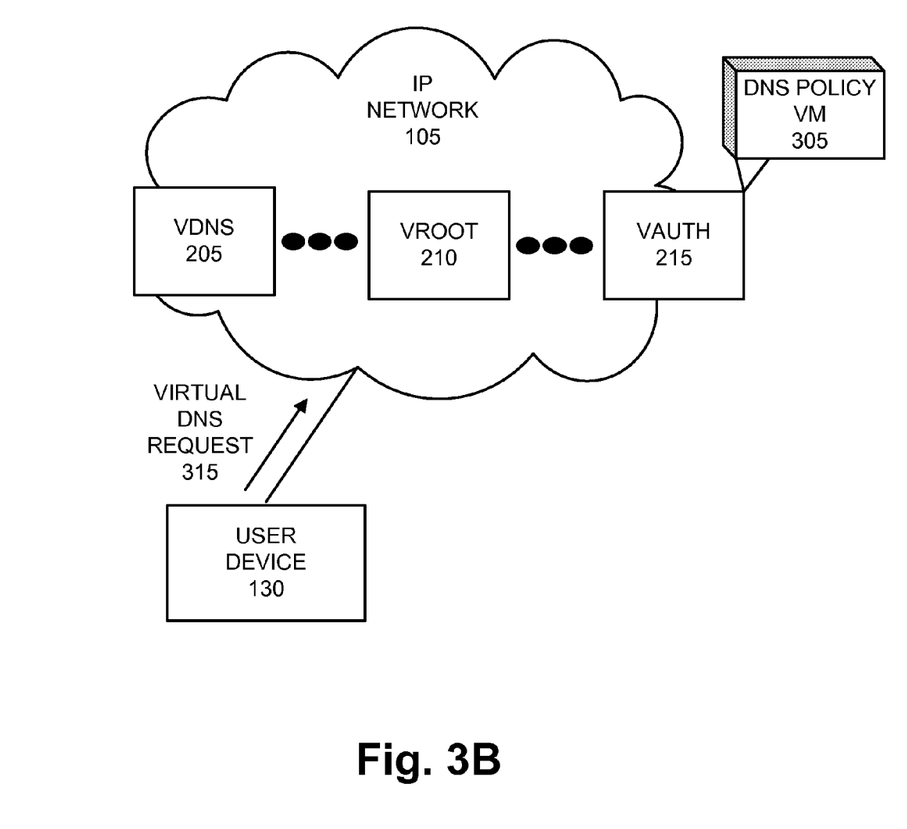

FIG. 3B is a diagram illustrating an exemplary environment in which policy-based IP address resolution may be implemented. According to an exemplary scenario, assume that the policy pertains to a period of time with which to provide URI to IP address translation. According to this policy, different IP addresses may be used when the time to provide a virtual DNS response exceeds a particular time period. According to an exemplary implementation, the virtual domain name system uses the Network Time Protocol (NTP) to synchronize the time between name servers 200.

As illustrated in FIG. 3B, assume that user device 130 transmits virtual DNS request 315 to virtual authoritative server 215. According to this scenario, a primary virtual authoritative server 215 is down (e.g., due to repair) and the virtual DNS request 315 is forwarded to secondary virtual authoritative server 215. However, as a result of the failure, the policy-based time period has lapsed. As a result, secondary virtual authoritative server 215 selects a resource record, based on this policy, with which to resolve the URI.

Figure 3C:
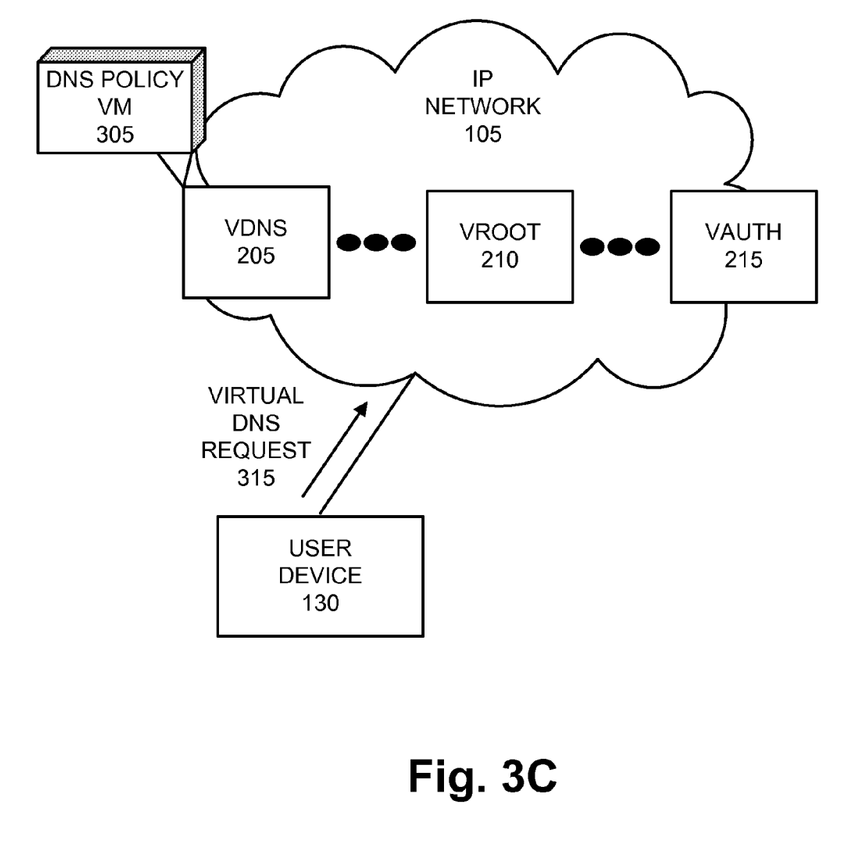

FIG. 3C is a diagram illustrating an exemplary environment in which policy-based IP address resolution may be implemented. According to this scenario, assume that there is a policy to provide different IP addresses based on the device. For example, the policy may provide that virtual name servers 200 resolve to a set of IP addresses when a device is internal (e.g., in relation to the virtual name servers 200) and another set of IP addresses when a device is external. According to an exemplary scenario, assume that user device 130 is a device within a private network to which the virtual domain name system belongs. That is, user device 130 is considered an internal device.

Assume that virtual domain name server 205 receives virtual domain name system request 315 and identifies that the source address relates to a device that is internal. According to this example, virtual domain name server 205 resolves the URI to a private IP address in contrast to a public IP address. Additionally, the virtual DNS response may include other information, such as a specific network element model name, depending on the classification (e.g., internal, external) of the requesting source IP address. For example, a device externally resolvable to a network element model name (e.g., r1.tla) may be resolved to another network element model name (e.g., cisco-crs3.tla) to an employee that is troubleshooting from a corporate network. In the network element model name, "cisco" identifies the vendor, "crs3" represents the platform model, and "tla" is the three-letter acronym that identifies the location (e.g., city, hub) of the device. The virtual DNS response may provide a normal non-descript resolution for a subscriber's IP address, when resolved as external, but provide a subscriber identifier (e.g., as information for security personnel), when resolved as internal.

Figure 4:
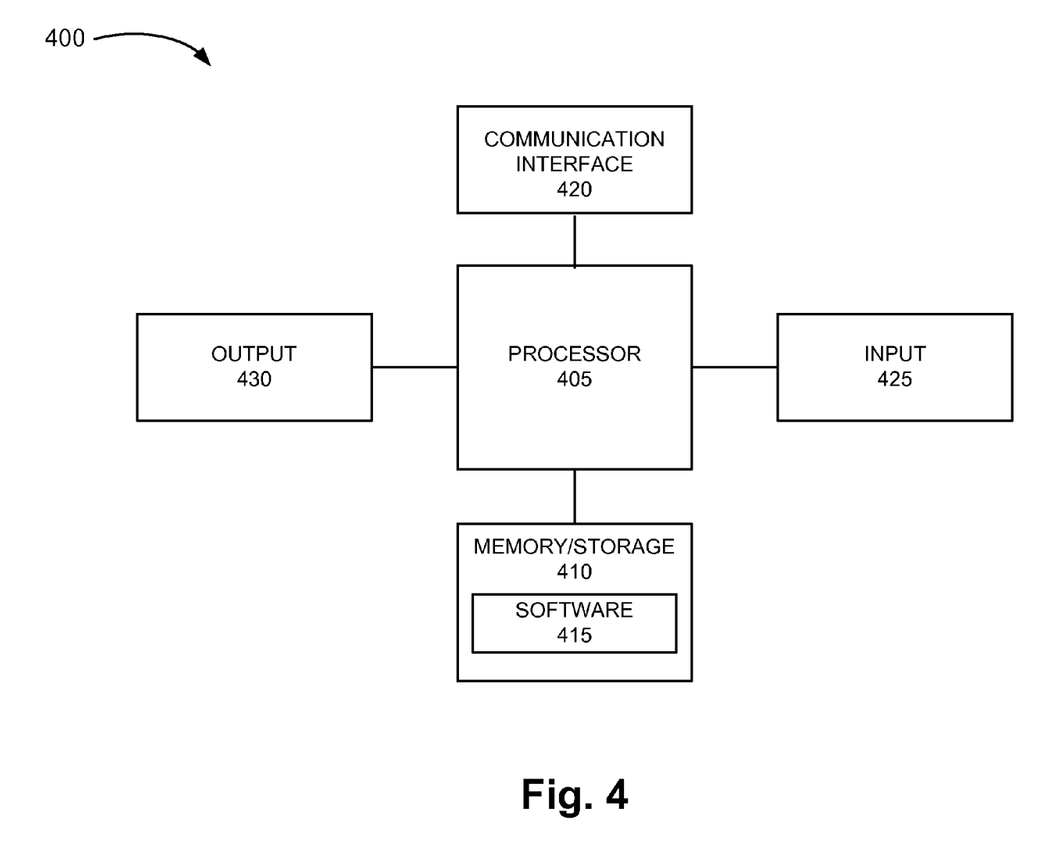
FIG. 4 is a diagram illustrating exemplary components of a device that may correspond to one or more of the devices depicted in the previous figures.

FIG. 4 is a diagram illustrating exemplary components of a device 400 that may correspond to one or more of the devices depicted in the previous figures. As illustrated, according to an exemplary embodiment, device 400 includes a processor 405, memory/storage 410, software 415, a communication interface 420, an input 425, and an output 430. According to other embodiments, device 400 may include fewer components, additional components, different components, and/or a different arrangement of components than those illustrated in FIG. 4 and described herein.

Processor 405 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 may include one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 may include an application or a program that provides a function and/or a process. Software 415 may include firmware. For example, virtual domain name server 205, virtual root name server 210, and virtual authoritative name server 215 may be implemented with one or more program(s) and/or application(s). Additionally, for example, other devices (e.g., user device 130) may be implemented with software 415 to provide a function and/or a process described herein.

Communication interface 420 may permit device 400 to communicate with other devices, networks, systems, etc. Communication interface 420 may include one or multiple wireless interfaces and/or wired interfaces. Communication interface 420 may include one or multiple transmitters, receivers, and/or transceivers. Communication interface 420 may operate according to one or multiple protocols, standards, and/or the like.

Input 425 may permit an input into device 400. For example, input 425 may include a keyboard, a keypad, a mouse, a display, a touchscreen, a touchless screen, a button, a switch, an input port, speech recognition logic, and/or some other type of visual, auditory, tactile, etc., input component. Output 430 may permit an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, instructions may be read into memory/storage 410 from another memory/storage 410 or from another device via communication interface 420. The instructions stored by memory/storage 410 may cause processor 405 to perform one or more processes described herein. Alternatively, for example, according to other implementations, device 400 may perform one or more processes described herein based on the execution of hardware (e.g., processor 405).

Figure 5:
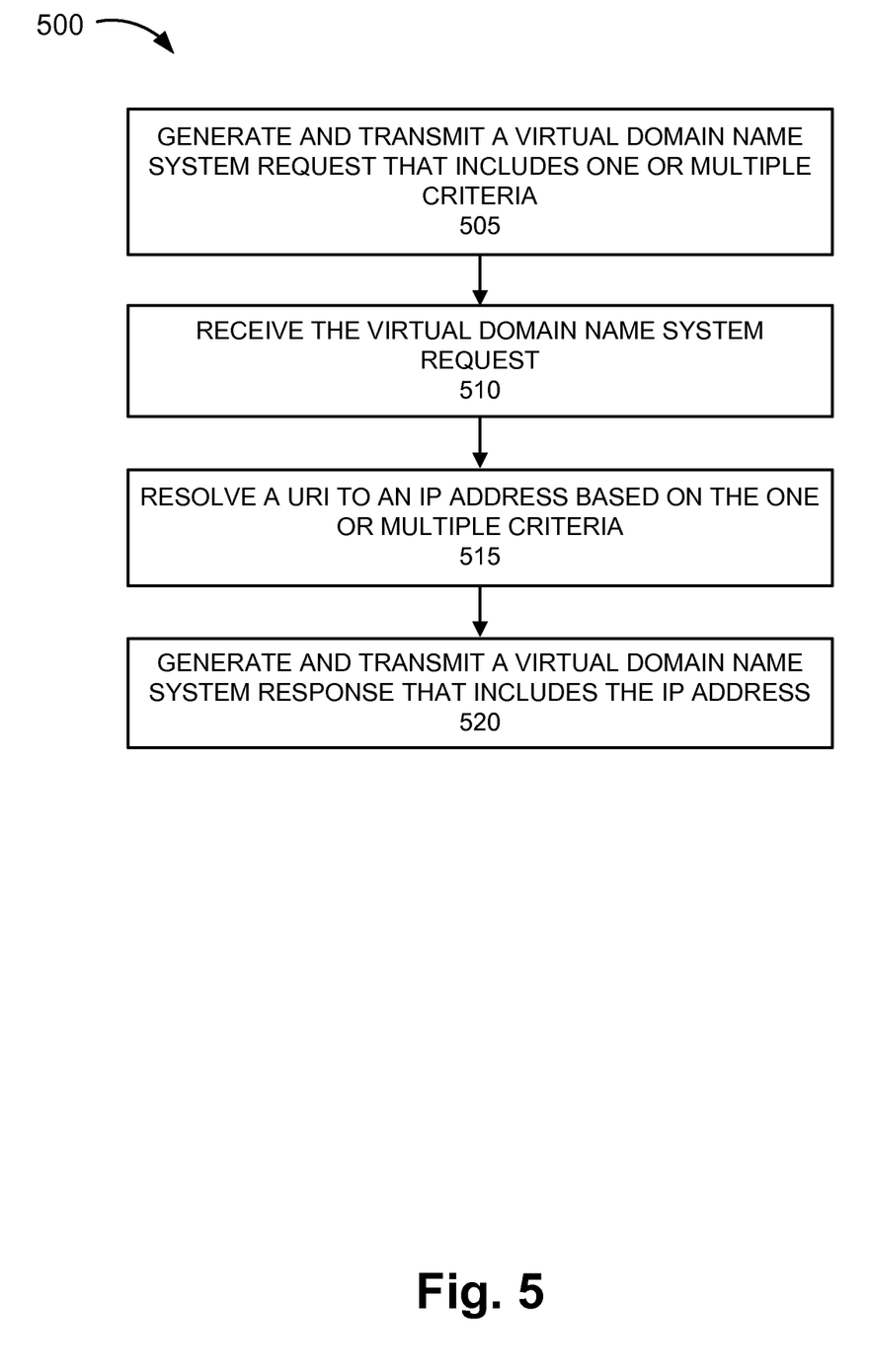
FIG. 5 is a flow diagram illustrating an exemplary process for resolving a URI to an IP address based on one or multiple criteria.

FIG. 5 is a flow diagram illustrating an exemplary process 500 for resolving a URI to an IP address based on one or multiple criteria according to an exemplary embodiment of a virtual domain name system. A step or an act described in process 500 is performed by virtual domain name system network devices 120 illustrated in FIG. 1. For example, a step or an act of process 500 may be performed by virtual domain name server 205, virtual root name server 210, or virtual authoritative name server 215 in which processor 405 executes software 415 to perform the step or the act described. For purposes of description, process 500 is described in relation to virtual domain name server 205.

Process 500 begins, in block 505, with a virtual domain name system request that includes one or multiple criteria being generated and transmitted to a virtual domain name system. For example, a virtual DNS client resolver of user device 130 generates a virtual domain name system request that includes criterion information. User device 130 transmits the virtual domain name system request to the virtual domain name system.

In block 510, the virtual domain name system request is received. For example, virtual domain name server 205 receives the virtual domain name system request.

In block 515, a URI to an IP address is resolved based on the one or multiple criteria. For example, virtual domain name server 205 identifies the criterion information and selects a resource record that maps to the criterion information.

In block 520, a virtual domain name system response that includes the IP address is generated and transmitted to a virtual domain name system client. For example, virtual domain name server 205 generates a virtual domain name system response. Virtual domain name server 205 transmits the virtual domain name system response to user device 130.

Although FIG. 5 illustrates an exemplary process 500 for resolving a URI to an IP address based on one or multiple criteria, process 500 may include additional operations, fewer operations, and/or different operations than those illustrated in FIG. 5 and described herein. For example, criterion information may be provided to a name server based on a communication with another device or generated by the name server.

Figure 6:
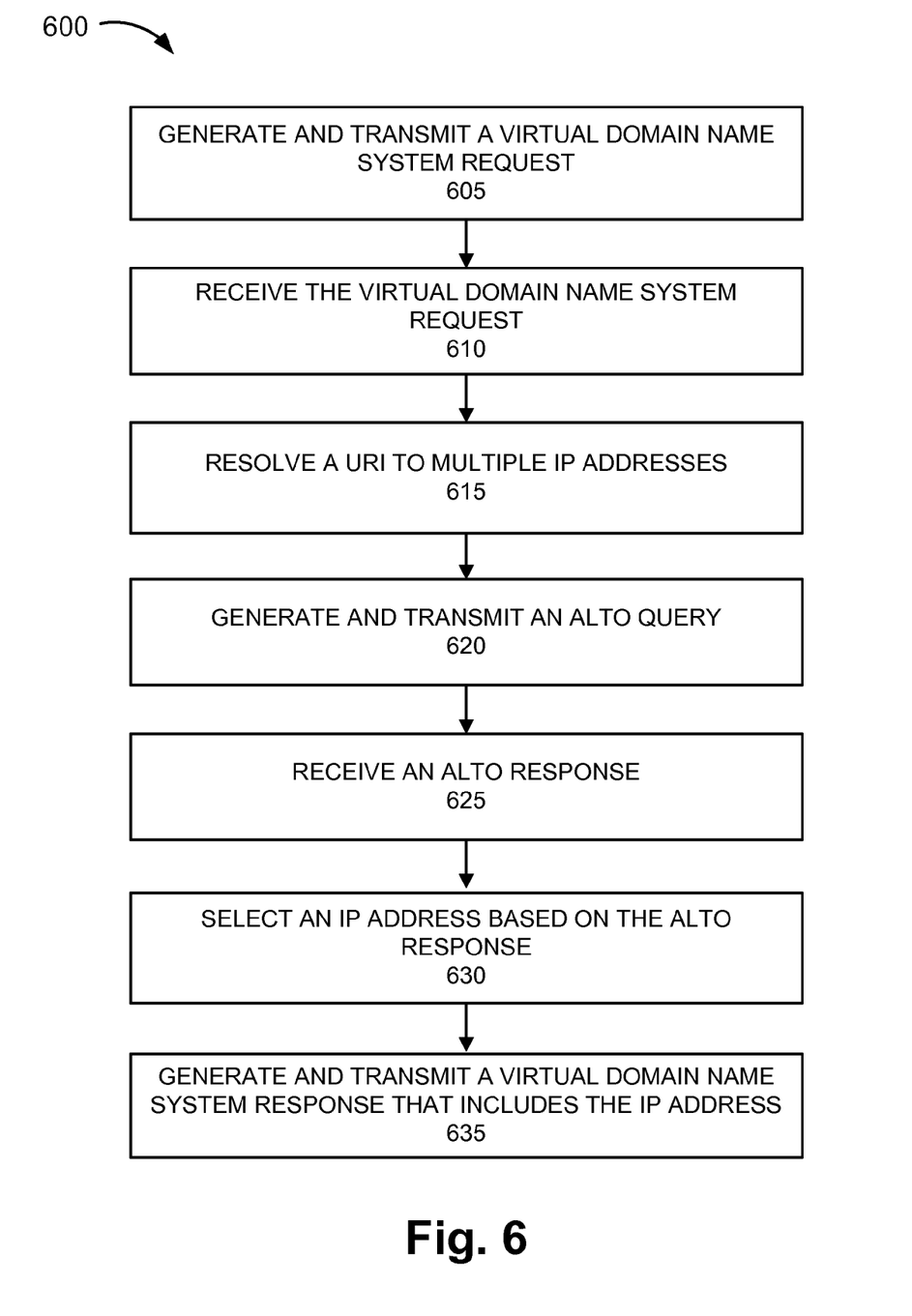
FIG. 6 is a flow diagram illustrating an exemplary process for resolving a URI to an IP address based on a communication with an Application-Layer Traffic Optimization (ALTO) server.

FIG. 6 is a flow diagram illustrating an exemplary process 600 for resolving a URI to an IP address based on a communication with an ALTO server according to an exemplary embodiment of a virtual domain name system. A step or an act described in process 600 is performed by virtual domain name system network devices 120 illustrated in FIG. 1. For example, a step or an act of process 600 may be performed by virtual domain name server 205, virtual root name server 210, or virtual authoritative name server 215 in which processor 405 executes software 415 to perform the step or the act described. For purposes of description, process 600 is described in relation to virtual domain name server 205.

Process 600 begins, in block 605, with a virtual domain name system request being generated and transmitted to a virtual domain name system. For example, a virtual DNS client resolver of user device 130 generates a virtual domain name system request that includes criterion information. User device 130 transmits the virtual domain name system request to the virtual domain name system.

In block 610, the virtual domain name system request is received. For example, virtual domain name server 205 receives the virtual domain name system request.

In block 615, a URI to an IP address is resolved. For example, virtual domain name server 205 may select multiple IP addresses relating to the URI. As an example, according to a peer-to-peer scenario, a URI may yield multiple IP addresses that distribute a media file.

In block 620, an ALTO query is generated and transmitted. For example, virtual domain name server 205 generates an ALTO query that includes the multiple IP addresses. The ALTO query may include one or multiple cost types (e.g., geographical location, transmission cost, the amount of remaining traffic allowed by a peer's operator (e.g., in case of quotas or limited flat-rate pricing models), etc.).

In block 625, an ALTO response is received. For example, virtual domain name server 205 receives an ALTO response from an ALTO server.

In block 630, an IP address is selected based on the ALTO response. For example, virtual domain name server 205 selects, based on a ranking of IP addresses pertaining to the cost type, an IP address. For example, if the cost type is geographic location, the IP address may relate to a peer device that is closest to user device 130.

In block 635, a virtual domain name system response that includes the IP address is generated and transmitted to a virtual domain name system client. For example, virtual domain name server 205 generates a virtual domain name system response. Virtual domain name server 205 transmits the virtual domain name system response to user device 130.

Although FIG. 6 illustrates an exemplary process 600 for resolving a URI to an IP address based on a communication with an ALTO server, process 600 may include additional operations, fewer operations, and/or different operations than those illustrated in FIG. 6 and described herein. For example, an ALTO server may initiate a transient vDNS spin-up based on a per-asset, per-region or a volume of request, per-asset, per-region based on an assigned threshold. That is, once the threshold is met (e.g., rate over time, absolute number, etc.), the spin-up request is initiated.

Figure 7:
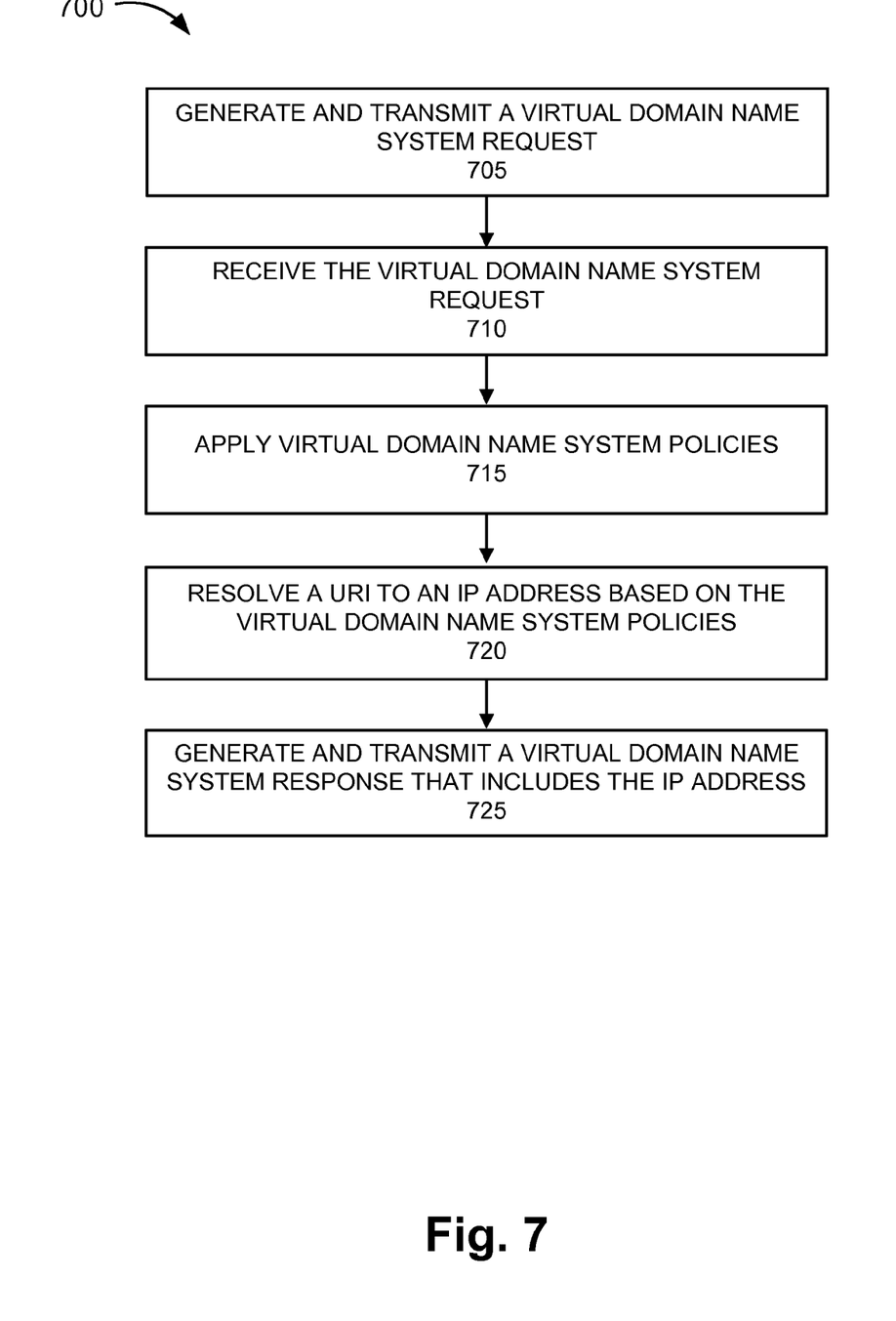
FIG. 7 is a flow diagram illustrating an exemplary process for resolving a URI to an IP address based on virtual domain name system policies.

FIG. 7 is a flow diagram illustrating an exemplary process 700 for resolving a URI to an IP address based on virtual domain name system policies according to an exemplary embodiment of a virtual domain name system. A step or an act described in process 700 is performed by virtual domain name system network devices 120 illustrated in FIG. 1. For example, a step or an act of process 700 may be performed by virtual domain name server 205, virtual root name server 210, or virtual authoritative name server 215 in which processor 405 executes software 415 to perform the step or the act described. For purposes of description, process 700 is described in relation to virtual root name server 210.

Process 700 begins, in block 705, with a virtual domain name system request being generated and transmitted to a virtual domain name system. For example, a virtual DNS client resolver of user device 130 generates a virtual domain name system request that includes criterion information. User device 130 transmits the virtual domain name system request to the virtual domain name system.

In block 710, the virtual domain name system request is received. For example, virtual root name server 210 receives the virtual domain name system request.

In block 715, virtual domain name system policies are applied. For example, based on the virtual domain name system request (e.g., the source IP address), virtual root name server 210 may identify that user device 130 is an internal device.

In block 720, a URI to an IP address is resolved based on the virtual domain name system policies. For example, virtual root name server 210 selects a resource record to resolve the URI based on the policies pertaining to internal devices.

In block 725, a virtual domain name system response that includes the IP address is generated and transmitted to a virtual domain name system client. For example, virtual root name server 210 generates a virtual domain name system response. Virtual root name server 210 transmits the virtual domain name system response to user device 130.

Although FIG. 7 illustrates an exemplary process 700 for resolving a URI to an IP address based on virtual domain name system policies, process 700 may include additional operations, fewer operations, and/or different operations than those illustrated in FIG. 7 and described herein. For example, depending on the policy, virtual root name server 210 may identify and apply the policy for IP address resolution before (e.g., based on the virtual DNS request) or after URI to IP address resolution takes place (e.g., after selection of a resource record, etc.).

Additionally, or alternatively, policies may be used to invoke virtual name servers 200 to generate new sub-domains. The new sub-domains may be transient, permanent, etc., as previously described. For example, transient sub-domains may be generated based on a threshold. Sub-domain transience may also have a hold-timer or persistence metric based on a minimum/maximum/average rate bounding or half-life timer. For example, the sub-domain may be created when a rate of requests from a given region surpasses the rate, for example 100 requests per second. The sub-domain may persist as long as a minimum rate is maintained for a given interval, for example 10 per second over one day. Additionally, a half-life timer may be enacted to decay at a given interval, for example every minute, unless new requests are received for that context, for example a given geographic region. The policies may also be triggered by sales events, such as Labor Day Weekend, or based on outages or product advisories, and closed when the event ends, either, for example, a predefined interval or based on a monitored closure of an event.

As previously described, virtual name servers 200 may use criterion information. For example, tokens, flags, indicators, etc., may be used to indicate a criterion. The criterion information may be included in a virtual DNS message or the criterion information may be appended to the virtual DNS message. Virtual name servers 200 may communicate with other devices or systems to provide URI to IP address resolution. For example, virtual name servers 200 may communicate with an ALTO server, a policy device that stores virtual domain name system policies, or another device that obtains criterion information. By way of example, criterion information may include the location of the user, the type of user device 130, etc., as previously described.

According to an exemplary embodiment, virtual name servers 200 may generate criterion information. For example, virtual name servers 200 may identify whether user device 130 is a wired device or a wireless device based on an IP address masking process. By way of example, virtual domain name server 205 may perform a logical operation using a mask to the source IP address of user device 130. Depending on the result of the logical operation, virtual domain name server 205 is able to identify that user device 130 is a wired device or a wireless device. This information may be used as criterion information, and in turn, used for IP address resolution. The network(s) that a wired device versus a wireless device may use to reach a destination are different. The selection of an IP address based on the criterion information may consider these differences, as well as other differences that may flow therefrom (e.g., delivery criteria, content quality, etc.).

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the processes illustrated in FIGS. 5-7, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 405, etc.) and/or a combination of hardware and software (e.g., software 415). The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 410.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive. For example, a reverse virtual domain name system may be implemented based on this description. For example, an IP address that is associated with one or multiple criteria may be resolved to a domain name.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method comprising:
   receiving, by a name server from a device, a virtual domain name system request that includes one or multiple criteria to resolve a Uniform Resource Identifier to an Internet Protocol address, wherein overlay networks or virtual networks accommodate the one or more multiple criteria pertaining to the Internet Protocol address;
   identifying, based upon an assigned Internet Protocol address corresponding to the device, whether the device is internal in relation to the name server;
   resolving, by the name server, the Uniform Resource Identifier to the Internet Protocol address based on the one or multiple criteria, wherein the resolving of the Uniform Resource Identifier having new subdomains includes resolving a new subdomain generated based on whether a device is internal in relation to the name server;
   generating, by the name server, a virtual domain name system response that includes the resolved Internet Protocol address;
   providing, in the virtual domain name system response, a private identification of a subscriber associated with the device upon identifying that the device is internal, and providing non-descript information upon identifying that the device is external; and
   transmitting, by the name server, the virtual domain name system response to the device.

2. The method of claim 1, wherein the one or multiple criteria include one or more of a type of content to which the virtual domain name system request pertains, a type of application to which the virtual domain name system request pertains, a level of security to which the virtual domain name system request pertains, and a quality-of-service metric.

3. The method of claim 1, wherein the one or multiple criteria includes a type of device from which the virtual domain name system request originates, and further wherein the type of device includes information identifying whether the device is a user device or a device pertaining to a machine-to-machine communication.

4. The method of claim 1, wherein the virtual domain name system request is received from an intermediary device, located between the name server and the device, which generates and transmits the virtual domain name system request, and the receiving comprises: receiving, from the intermediary device, data pertaining to the one or more multiple criteria.

5. A method comprising:
   storing, by a name server, policies pertaining to resolving Uniform Resource Identifiers to Internet Protocol addresses;
   generating, by the name server, new sub-domains based on one or more of the policies stored by the name server, wherein a first policy of the one or more stored policies pertains to whether a device is internal in relation to the name server;
   receiving, by the name server from the device, a virtual domain name system request;
   identifying, based upon an assigned Internet Protocol address corresponding to the device, whether the device is internal in relation to the name server;
   resolving, by the name server, a Uniform Resource Identifier to an Internet Protocol address based on one or more of the policies;
   generating, by the name server, a virtual domain name system response that includes the resolved Internet Protocol address;
   providing, in the virtual domain name system response, a private identification of a subscriber associated with the device upon identifying that the device is internal, and providing non-descript information upon identifying that the device is external; and
   transmitting, by the name server, the virtual domain name system response to a device.

6. The method of claim 5, wherein the policies include one or more policies pertaining to an access restriction for one or more Uniform Resource Identifiers, and a latency pertaining to a time period in which the Uniform Resource Identifier to the Internet Protocol address is resolved.

7. The method of claim 6, further comprising:
   identifying, by the name server, the one or more of the policies to be used for resolving the Uniform Resource Identifier to the Internet Protocol address.

8. The method of claim 6, further comprising:
   generating an Application-Layer Traffic Optimization (ALTO) query;

transmitting the ALTO query to an ALTO server; and
receiving an ALTO response, and wherein the resolving further comprises:
resolving the Uniform Resource Identifier to the Internet Protocol address based on the ALTO response.

9. A network device, comprising:
a communication interface;
a memory to store instructions; and
a processor to execute the instructions to:
receive, via the communication interface from a device, a virtual domain name system request that includes one or multiple criteria to resolve a Uniform Resource Identifier to an Internet Protocol address, wherein overlay networks or virtual networks accommodate the one or multiple criteria pertaining to the Internet Protocol address;
identify, based upon an assigned Internet Protocol address corresponding to the device, whether the device is internal in relation to the network device;
resolve the Uniform Resource Identifier to the Internet Protocol address based on the one or multiple criteria, wherein the instructions to resolve the Uniform Resource Identifier having new subdomains includes instructions to resolve a new subdomain generated based on whether a device is internal in relation to the name server;
generate a virtual domain name system response that includes the Internet Protocol address;
provide, in the virtual domain name system response, a private identification of a subscriber associated with the device upon identifying that the device is internal, and provide non-descript information upon identifying that the device is external; and
transmit, via the communication interface, the virtual domain name system response to the device.

10. The network device of claim 9, wherein the network device includes one of a root name server, an authoritative name server, or a name server.

11. The network device of claim 9, wherein the one or multiple criteria include one or more of a type of content to which the virtual domain name system request pertains, a type of application to which the virtual domain name system request pertains, a level of security to which the virtual domain name system request pertains, or a quality-of-service metric.

12. The network device of claim 11, further comprising:
a storage medium that stores resource records that map IP addresses to the one or multiple criteria.

13. A network device comprising:
a communication interface;
a memory to store instructions; and
a processor to execute the instructions to:
store policies pertaining to a resolution of Uniform Resource Identifiers to Internet Protocol addresses;
generate new sub-domains based on one or more of the stored policies, wherein a first policy of the stored policies pertains to whether a device is internal in relation to the network device;
receive, via the communication interface from the device, a virtual domain name system request;
identify, based upon an assigned Internet Protocol address corresponding to the device, whether the device is internal in relation to the network device;
resolve a Uniform Resource Identifier to an Internet Protocol address based on the one or more of the policies;
generate a virtual domain name system response that includes the resolved Internet Protocol address;
provide, in the virtual domain name system response, a private identification of a subscriber associated with the device upon identifying that the device is internal, and providing non-descript information upon identifying that the device is external; and
transmit, via the communication interface, the virtual domain name system response to a device.

14. The network device of claim 13, wherein the policies include one or more policies pertaining to an access restriction for one or more Uniform Resource Identifiers, and a latency pertaining to a time period in which the Uniform Resource Identifier to the Internet Protocol address is resolved.

15. The network device of claim 13, wherein the processor is further to execute the instructions to:
generate an Application-Layer Traffic Optimization (ALTO) query;
transmit, via the communication interface, the ALTO query to an ALTO server; and
receive, via the communication interface, an ALTO response, and wherein when resolving, the processor is further to execute the instructions to:
resolve the Uniform Resource Identifier to the Internet Protocol address based on the ALTO response.

16. A non-transitory storage medium storing instructions executable by a computational device, wherein the instructions comprise instructions to:
receive a virtual domain name system request from a device;
obtain one or multiple criteria to resolve a Uniform Resource Identifier to an Internet Protocol address, wherein the one or more multiple criteria are included in the domain name system request, wherein overlay networks or virtual networks accommodate the one or multiple criteria pertaining to the Internet Protocol address;
identify, based upon an assigned Internet Protocol address corresponding to the device, whether the device is internal in relation to the computational device;
resolve the Uniform Resource Identifier to the Internet Protocol address based on the one or multiple criteria, wherein the instructions to resolve the Uniform Resource Identifier having new subdomains includes instructions to resolve a new subdomain generated based on whether a device is internal in relation to the name server;
generate a virtual domain name system response that includes the resolved Internet Protocol address;
provide, in the virtual domain name system response, a private identification of a subscriber associated with the device upon identifying that the device is internal, and provide non-descript information upon identifying that the device is external; and
transmit the virtual domain name system response to a domain name system client device.

17. The non-transitory storage medium of claim 16, wherein the one or multiple criteria include one or more of a type of content to which the virtual domain name system request pertains, a type of application to which the virtual domain name system request pertains, a level of security to which the virtual domain name system request pertains, and a quality-of-service metric.

18. The non-transitory storage medium of claim 17, wherein the instructions comprise further instructions to:
store resource records that are mapped to the one or multiple criteria.

19. The non-transitory storage medium of claim 16, wherein the one or multiple criteria include a type of device from which the virtual domain name system request originates, and wherein the type of device includes information identifying whether the device is a user device or a device pertaining to a machine-to-machine communication.

20. The non-transitory storage medium of claim 16, wherein the one or multiple criteria include one or more of a type of content to which the virtual domain name system request pertains, a type of application to which the virtual domain name system request pertains, a level of security to which the virtual domain name system request pertains, and a quality-of-service metric.

* * * * *